Jan. 12, 1954   W. B. HEATH   2,665,601
DEVICE FOR STRETCHING AND SHAPING SPECTACLE FRAMES
Filed June 30, 1949   3 Sheets-Sheet 3

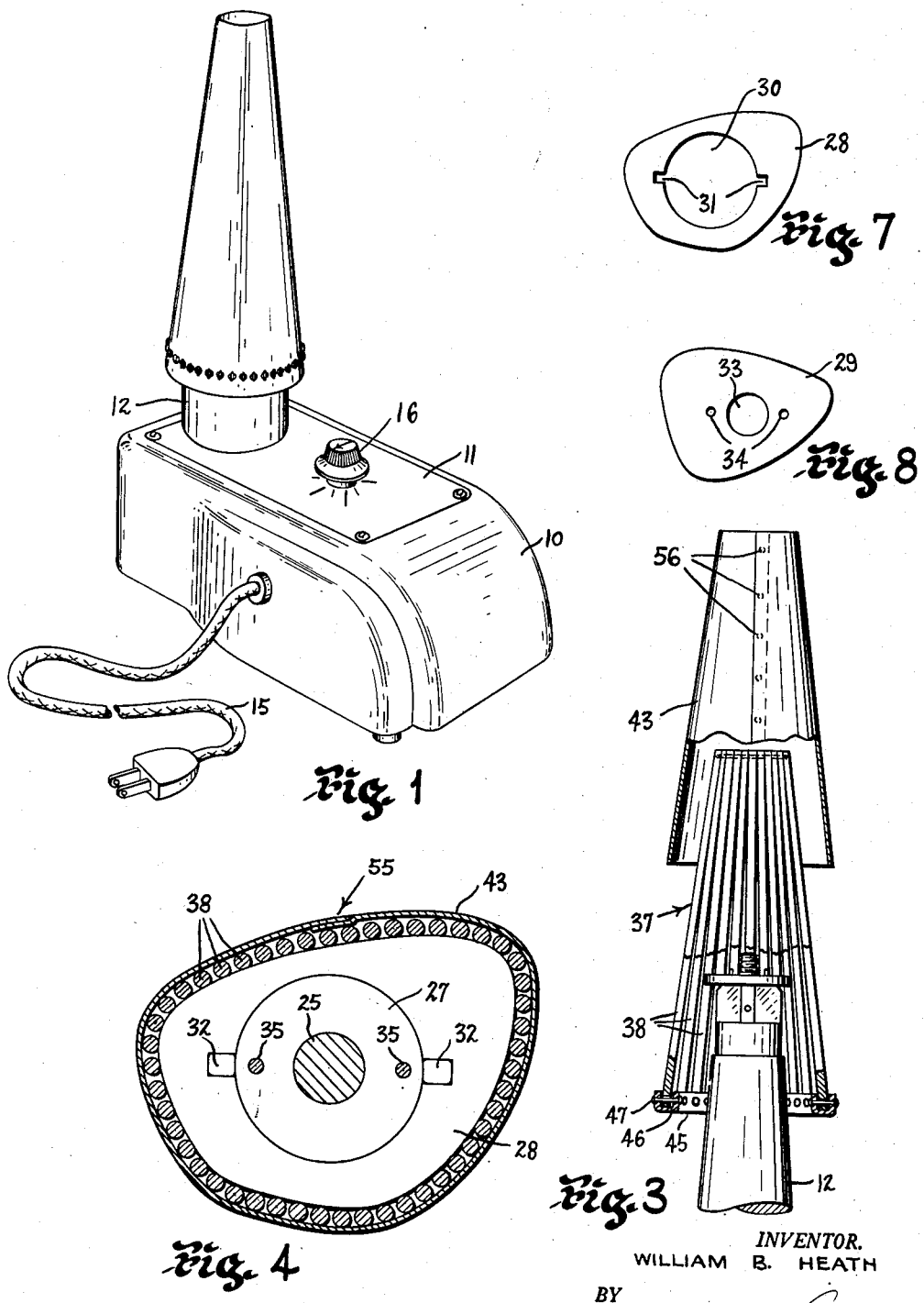

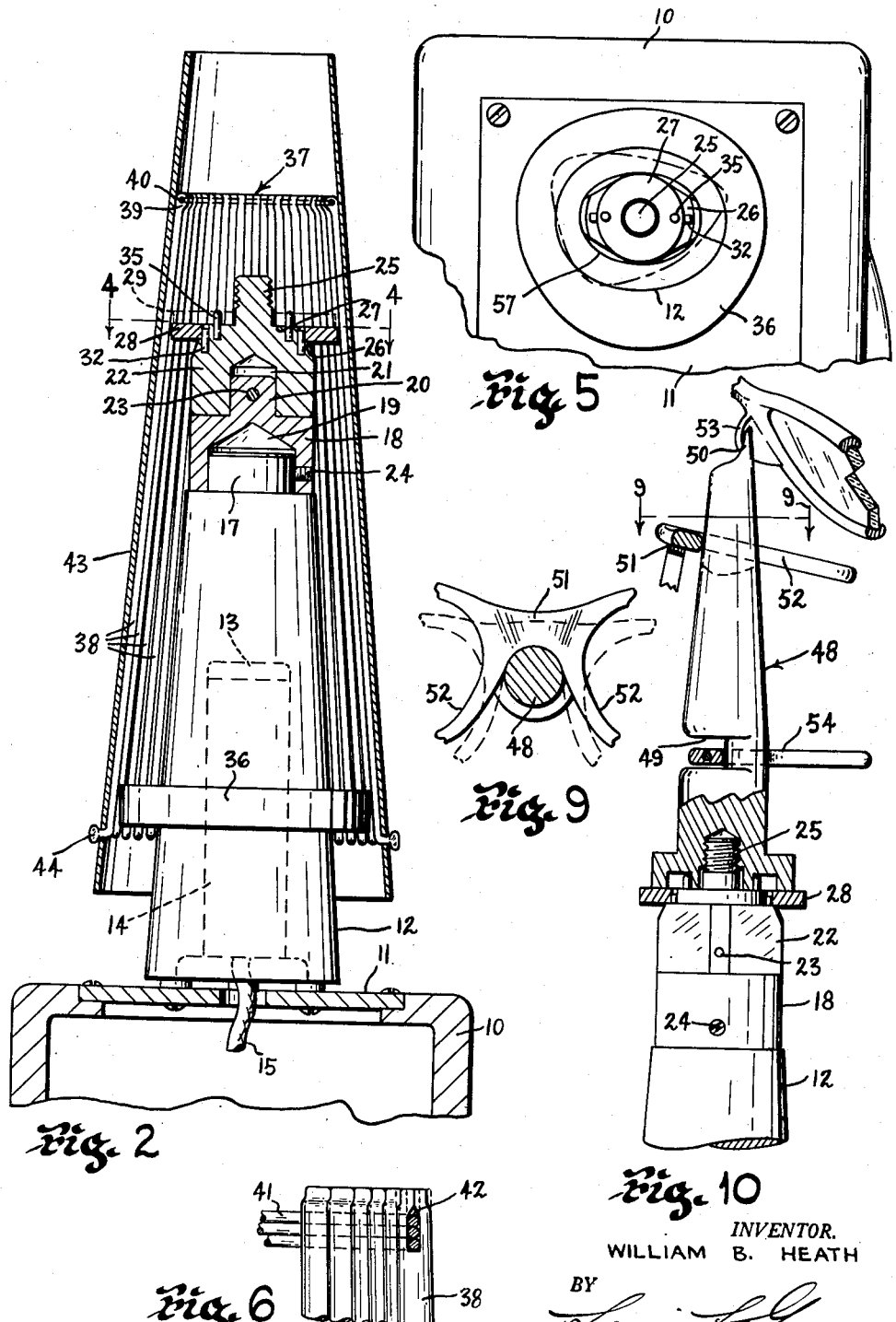

INVENTOR.
WILLIAM B. HEATH
BY
ATTORNEY

Patented Jan. 12, 1954

2,665,601

UNITED STATES PATENT OFFICE 2,665,601

DEVICE FOR STRETCHING AND SHAPING SPECTACLE FRAMES

William B. Heath, New Bedford, Mass., assignor to American Optical Company, Southbridge, Mass., a voluntary association of Massachusetts Application June 30, 1949, Serial No. 102,203

14 Claims. (Cl. 81—3.5)

This invention relates to devices for stretching and shaping spectacle frames and has particular reference to combined means and method for stretching the rims of spectacle frames made of heat softenable plastic material and for shaping other parts of the frames.

The principal object of this invention is to provide an improved device for stretching the rims of spectacle frames made of plastic material and comprising means for shaping the rim receiving sleeve portion of the device in accordance with the shape of the lenses to be inserted in the rims whereby the rims as they are stretched will assume substantially the shape of the lenses.

Another object of this invention is to provide improved means of the above character embodying a heating element encircled by a unit formed of a plurality of adjustable rod members and having a flexible sleeve positioned thereover, the unit being adjustable in accordance with the contour shape of the lens to be inserted in the rim to be stretched and the flexible sleeve assuming a shape in accordance with the shape of the unit whereby a rim located upon the sleeve may be stretched and will assume substantially the contour shape of the lens to be inserted therein.

Another object of this invention is to provide improved means of the above character embodying means for carrying conventional types of patterns or formers commonly used in the manufacture of ophthalmic lenses for controlling the contour edge shapes of lenses during the grinding thereof, the patterns being located within the unit formed of rod members and controlling the adjustment thereof whereby the flexible rim receiving sleeve intimately positioned thereover will cause the contour shape of the pattern to be substantially accurately transferred to the rims being stretched thereon.

Still another object of this invention is to provide improved means of the above character embodying a base having a substantially conical heating element positioned thereon and means for controlling the heat of said element, a pattern or former carried by said heating element and having a contour shape substantially the shape of the lenses to be inserted in the rims to be stretched, a ring member disposed over the heating element adjacent its end of greatest diameter, a substantially conical adjustable supporting member formed of a plurality of tines or rods which are connected together at one end and adapted to be adjusted with respect to one another, the supporting member being normally supported over the heating element by the ring member and pattern and assuming substantially the shape of the ring member and pattern in the areas of engagement thereby, and a sleeve mounted over and supported by the supporting member, the sleeve being flexible and thereby adapted to assume the external shape of the supporting member, with the rim to be stretched being positioned over the sleeve and in engagement therewith in the general area having substantially the shape of the contour of the pattern, the heating being transferred from the heating element throughout the parts supported thereon to the rim whereby the rim will become softened and pliable and may be stretched and shaped to assume the shape of the sleeve in the area of engagement therewith.

Another object is to provide means of the above character embodying as a unit a base supporting a heating element and having means for interchangeably supporting lens patterns of different configurations and further embodying as a unit a conical sheath of relatively thin distortable material having a plurality of rods secured thereto adjacent the lower ends of the rods with said rods being connected with each other adjacent their upper ends by deformable means whereby the rods are free, through the deformable nature of the material of the sheath, to conform to the shape of the pattern carried by the first unit and will simultaneously cause the sheath to assume the shape of the conformation of the rods.

Another object is to provide a conical unit of the above character wherein the rods, throughout the area thereof which engage with the lens pattern or former, are hardened to resist wear.

Another object is to provide means of the above character with which the conventional lens patterns or formers used in edging lenses may be employed in shaping the rims to the required shape for receiving said lenses and which, during the shaping of the rims, will be so situated as to be at the location or adjacent the area where the actual stretching of the rims takes place.

Another object is to provide a simple, efficient, and novel method of forming a conical unit having an effectively outer continuous surface with a plurality of rod-like members internally thereof whereby the said rods and outer conical member are readily free to conform or to be distorted to any shape desired.

Another object is to provide a device of the above character wherein the conical sheath supporting unit is formed of a sheet of corrugated material having its meeting ends fixedly connected and having the corrugations at one end widely spaced in comparison with the other end thereof to form a conical unit conformable to the shape of the pattern.

A still further object is to provide improved means of the above character including means for shaping the bridges, temples and nose pads of ophthalmic frames and embodying an upright removably secured to said heating element and having portions thereof shaped to receive portions of the frame in adjusting and shaping said frame portions as desired.

Another object is to provide in a manner as hereinafter set forth means of the above character for shaping various parts of frames of the type used in ophthalmic mountings, which means are comparatively simple in construction, thoroughly efficient in operation, durable and relatively economical to manufacture.

Other objects and advantages of the invention will become apparent from the following description taken in connection with the accompanying drawings, in which:

Fig. 1 is a respective view of an embodiment of the invention;

Fig. 2 (sheet 2) is a fragmentary sectional view of the heating element and preferred rim supporting structure;

Fig. 3 (sheet 1) is a fragmentary sectional view similar to Fig. 2, showing a modification thereof;

Fig. 4 is a sectional view taken substantially on line 4—4 of Fig. 2 and looking in the direction of the arrows;

Fig. 5 (sheet 2) is a fragmentary top view of the device with part of the rim supporting structure removed;

Fig. 6 is a fragmentary front view of a portion of the upper ends of the rim supporting rods;

Figs. 7 and 8 (sheet 1) are plan views of two conventional types of lens, patterns or formers;

Fig. 9 (sheet 2) is a diagrammatic view illustrating the method of shaping a bridge;

Fig. 10 is a fragmentary sectional view of the heating element with an upright thereon for shaping portions of spectacle frames.

Figures 11, 12:
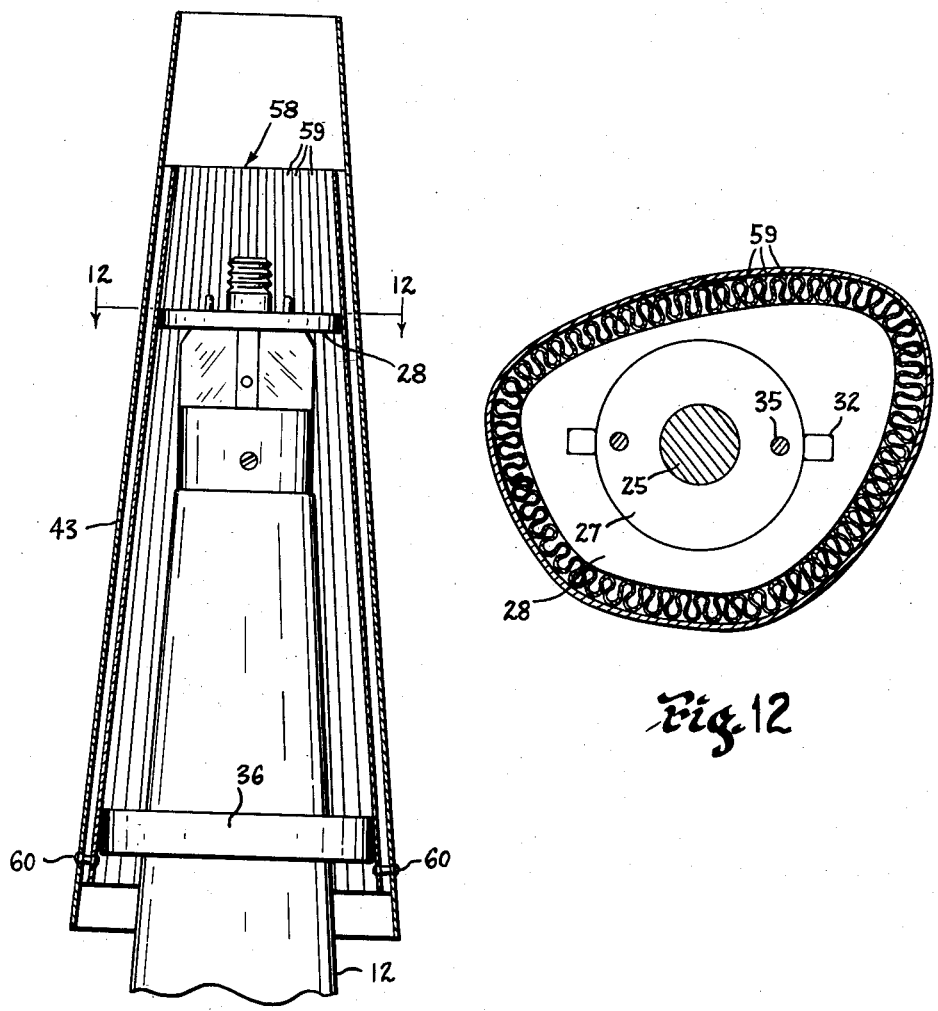
Fig. 11 is a fragmentary sectional view illustrating particularly a modification of the rim supporting structure.
Fig. 12 is a sectional view taken on line 12—12 of Fig. 11.

Referring to the drawings wherein like characters of reference designate like parts throughout the several views, the invention comprises a substantially heavy hollow base 10 of suitable design and having a cover plate 11 thereon. A tapered metal upright 12 has its end of greatest diameter suitably secured to the cover plate 11 and has a bore 13 therein (Fig. 2) in which is housed an electrical heating element 14 connected by wiring 15 to any convenient and suitable source of current. A rheostat 16 (Fig. 1) or other conventional control means can be provided, if desired, for controlling the heat of the element 14 so that sufficient heat can be introduced to the upright 12.

The upper end of the upright 12 has a short post 17 formed integral therewith and substantially axially aligned with the upright 12. The post 17 carries a pattern holding arrangement which can be made in many ways, the preferred form being shown in Fig. 2 wherein there is provided a block supporting member 18 having an opening 19 in its lower surface for reception of the post 17 and also having an integral projection 20 on its upper surface, which projection 20 is substantially coaxial with the upright 12 and is shaped to interfit with an opening 21 provided therefor in the lower surface of a pattern carrying block 22 resting upon the upper surface of the block supporting member 18. The block 22 is adapted to be fixedly located with respect to the member 18 by means of a pin 23 extending through the block 22 and projection 20, and the assembled unit is located in axial position on the end of the upright 12 by means of a set screw 24 extending through the member 18 for engagement with the post 17.

It is to be understood that the member 18 and block 22 may be formed as a one piece unit, if desired. However, in the construction illustrated in Fig 2, the block 22 is of a type used on conventional machines commonly used for shaping the edge contours of lenses in accordance with the shape of a pattern carried thereby. The blocks 22 are shaped to carry patterns or formers of the types used with either of the two most commonly known conventional edging machines, and to use the present device, it is merely necessary to remove the pattern from the edging machine and position it on the block 22.

The block 22 is provided with a threaded end portion 25 and has a pair of annular shelves 26 and 27 encircling the portion 25, the shelves 26 and 27 being in stepped relation for reception of one or another of a pair of patterns 28 and 29 (Figs. 7 and 8). The pattern 28 or 29 to be used in the device is shaped substantially to the contour shape of the lens which is to be inserted in the rim to be stretched, and it is to be understood that either type of pattern 28 or 29 can be used if it is provided with the desired contour shape.

The pattern 28, for instance, is provided with a central opening 30 having notches 31 communicating therewith and is adapted to be positioned on the lower shelf 26 with a pair of diametrically opposed pins 32 fixedly located in the shelf interfitting with the notches 31 to retain the pattern 28 in desired axial position. If a pattern 29 is selected rather than the pattern 28, this pattern 29 is positioned on the shelf 27 of the block 22 with its central opening 33 receiving the block portion 25 and with a pair of diametrically opposed openings 34 receiving pins 35 provided therefor in the shelf 27. Patterns other than those illustrated in Figs. 7 and 8 can be used with the present device by providing means for receiving the same on the block 22.

Encircling the upright 12 adjacent its lower end is a ringlike member 36 which has a somewhat oval contour shape (Figs. 2 and 5) which is substantially the enlarged contour shape of an "average" lens; that is, its contour shape is substantially that of a lens having its contour shaped as a medium between the extremes.

A removable substantially conically shaped sheath supporting unit 37 is disposed over the entire upper portion of the upright 12 and the parts mounted thereon and is adapted to be engaged adjacent its lower end by spaced portions of the peripheral edge of the ringlike member 36 and adjacent its upper end by the selected pattern which is located on the block 22. The unit 37 is formed of a plurality of rods 38 having their upper ends closely joined in circular fashion so that in extended position the rods 38 will normally extend outwardly as rays from a common center. The upper ends of the rods 38 may be joined in any manner and will provide for adjustment thereof such as by providing the ends of each rod 38 with a flattened portion 39 having a central opening 40 therethrough, with a small flexible wire 41 being threaded through the openings 40 to retain the ends of each of the rods 38 in intimate adjustable relation with respect to the rods on either side thereof.

Another satisfactory arrangement for securing the upper ends of the rods 38 is shown in Fig. 6 wherein each rod 38 is provided with a longitudinal slot 42 in the end thereof with the wire 41 being threaded through the slots 42 any desired number of times, after which the ends of the slots 42 are closed to seal the wire 41 therein.

The unit 37 is used to support and reinforce a flexible sleeve or sheath 43 which is substantially conically shaped and adapted to fit thereover, with the lower end portions 44 of the rods 38 being angled outwardly and adapted to extend through a plurality of spaced openings provided therefor in the lower or skirt end of the sleeve 43. The free ends of the portions 44 of the rods 38 may be clinched or otherwise shaped or connected to prevent them from being withdrawn. Other means, however, may be used for securing the lower ends of the rods 38 to the sleeve 43 as by brazing, soldering, riveting or the like.

Thus, there is formed an assembly comprising the sleeve or sheath 43 of thin, strong, flexible material, preferably metal, which will intimately fit with and assume substantially the shape of the unit 37 which forms an internal backing or reinforcement for supporting the sleeve 43.

Since the upper portion of the unit 37 and sheath 43 are supported by the pattern 28 or 29, it will be understood that this portion of the unit 37 and sheath 43 will assume a shape in accordance with the contour shape of the particular pattern used. Also, since the ringlike member 36 has a contour shape substantially that of an average lens, the lower end of the unit 37 will consequently engage the member 36 at various spaced intervals.

Since the contour shape of the pattern used is substantially the same as the contour shape of the lens which is to be fitted into the rim to be stretched in accordance with this invention, it will be understood that the sheath 43 will assume this shape in the "working" area; that is, the area immediately above or below the point of support by the pattern. This working area or zone, in addition to conforming closely to the shape of the peripheral edge of the pattern, will be rigid enough to prevent being distorted when the stretching and shaping operation is being performed on the lens rim.

It is important also to note that the heat from the element 14 will be transmitted by conductivity through the upright 12, member 18, block 22, pattern 28 or 29, and unit 37 to the working area of the sleeve 43, as well as by radiation from the heated upright 12 and attached parts to the sleeve 43.

When it is desired to stretch and shape the rim or lens carrying portion of an eyeglass or spectacle frame for insertion of a lens of a particular size and contour shape, the pattern of a size and shape corresponding to the lens is inserted on the block 22. The sheath 43 with the reinforcing unit 37 is then placed over the upright 12 and forced downwardly so as to cause the working area of the adjustable unit 37 and the sheath 43 to conform substantially to the contour shape of the pattern. Heat then is transmitted from the heating element 14 to the working area of the sheath 43 as described. The rim of the frame which is to be stretched is then placed on the sheath, and as the rim becomes heated it becomes pliable. Thus, as pressure is applied to force the rim downwardly along the working area of the sheath 43, it will become stretched until both the interior size and shape as desired in accordance with the size and shape of the pattern, and the rim is then removed from the sheath 43 and, upon insertion of the lens therein, is allowed to cool. The plastic material, which has the characteristic of shrinking on cooling will contract and intimately engage and grip the contour of the lens.

Referring to Fig. 3, there is shown a modification of the rim stretching structure. In this construction the ringlike member 36 for supporting the lower portions of the sheath 43 and unit 37 is omitted and the rods 38 forming the unit 37 are not connected to the sheath 43. The lower ends of the rods in this type of construction are in spaced relation and are connected to a retaining ring 45 which is substantially U-shaped in cross section to provide a groove 46 for receiving the ends of the rods 38, with pins 47 being inserted through each individual rod 38 and the adjacent sides of the grooved ring 45 for securing the rods 38 thereto. The upper ends of the rods are joined with each other in a manner similar to the constructions shown in Figures 2 and 6. Although the sheath is described as being separate from the rods, the lower end thereof could be secured to the retaining ring 45, as by soldering or welding, if desired.

To provide means for shaping other parts of spectacle frames there is provided an upright anvil 48 which, upon removal of the sheath 43 and unit 37, may be secured to the upper end of the block 22. The anvil 48 is provided with a threaded opening for reception of the end portion 25 of the block 22 and in operating position is threaded onto the portion 25 into intimate engagement with the pattern 28 or 29 used. This will permit heat from the heating element 14 to be transmitted to the anvil 48.

The anvil is substantially conically shaped and round in section and is provided in its lower extremity with a slot 49, the slot 49 having a curved bottom, and at its upper end with a reduced tongue 50.

In shaping a portion of a frame such, for example, as lengthening a bridge 51, the frame is placed upon the anvil 48 with the anvil being positioned beneath the bridge 51 between the nasal sides of the rims 52 as shown in Fig. 9. The bridge 51, after becoming sufficiently heated, can be forced downwardly which will cause the rims 52 to be spread farther apart. Then by pulling forwardly on the rims 52, to position them as shown in dotted outline in Fig. 9, the bridge 51 will be stretched and upon cooling will be substantially longer than originally shaped.

A nose pad 53 can be shaped as desired by positioning it against the tongue 50 for heating as shown in Fig. 10, manually manipulating the frame while the nose pad is held in engagement with the tongue 50 to alter the shape thereof, and then allowing it to cool to retain the new shape.

A temple 54 can be shaped by positioning it in the groove 49 of the anvil 48 and after it becomes sufficiently heated, bending, twisting or otherwise distorting it to shape it as desired and allowing it to cool and retain its new shape.

Although the anvil is described above as receiving heat from the heating unit 14 to facilitate the use of the anvil, portions of the frame may be preheated as by the conventional salt bath treatment or the like or through the use of separate heating units whereby the heat may be directed to the particular parts to be altered rather than the frame in its entirety.

It is also apparent that when stretching the rims, the rims may be preheated in a similar manner if desired.

Although it is the usual practice to select a design of mounting having its rims of substantially the same shape as the lenses to be supported thereby, there are instances, particularly when such mountings are not immediately available, wherein a mounting having a different although closely related shape may be used. It is particularly pointed out that applicant's device, by reason of the fact that the lens former or pattern is located at or adjacent the effective working area of the stretching sheath or cone, will permit different shapes of rims to be stretched and made to conform to the shape of the pattern and lenses to be used therewith.

The sheath has been described as being formed of relatively thin deformable, heat-resisting material. It has been found that beryllium copper or stainless steel are particularly desirable as each can be formed relatively thin so as to be readily distortable or deformable while yet having a relatively ductile or resilient nature which will permit the overlapping of the longitudinal edges thereof, as shown at 55 in Fig. 4, which may be joined with each other by spot welding or the like as illustrated at 56 in Fig. 3. It is particularly pointed out that the overlapping edges, as illustrated in Fig. 4, are so formed as to have the outer surfaces of the adjacent edge portions in flush relation with each other.

The rods 38, as shown in Fig. 4, are formed preferably circular in cross-section whereby they will readily conform to the contour shape of the former or pattern regardless of its configuration and will permit the sheath to be spaced from the contour edge substantially uniformly regardless of the configuration of the pattern or former. This is very important in cases where extremely odd shape patterns are employed as it permits the sheath to more accurately conform to the contour shape of the pattern.

The rods, as shown either in Fig. 2 or Fig. 3, are preferably formed of a material whereby the portions of the rods which engage the contour of the patterns may be hardened to resist wear. The rods may be formed of piano wire, stainless steel or any other suitable metal.

The upper end of the upright 12, as shown best by the numeral 57 in Fig. 5, is formed oval in shape as is the remainder of the uprights and is of a size which is such as to lie within the limits of the contour shape of the smallest pattern to be used therewith. This is to insure that the rods 38 engage the pattern throughout its contour edge regardless of shape.

The ring-like member 36, as stated above, is preferably formed to an oval shape or a shape intermediate the general run of shapes of patterns in the ophthalmic art and is not intended as means for deforming the sheath but rather to provide means for preventing sidewise swinging movement of the sheath relative to the engagement of the rods with the pattern 28 or 29. This is brought about by the member 36 engaging with the portions of the rods internally of the lower ends thereof at spaced points as set forth above.

If desired, the annular member 36 may be formed integral with the upright 12 or made detachable and may be made to various shapes conforming to the shapes of the patterns to be used whereby both the upper and lower portions of the cones would be made to conform therewith and would be of the true desired shape throughout the length of the sheath.

The length of the sheath and the overall width of the base 10 are such as to permit stretching of the rims either with the temples in an upward or in a downward direction.

Although the sheath supporting unit 37 has been described as being formed of a plurality of rods 38 which are adjustable with respect to one another in accordance with their engagement with the pattern 28, it is to be understood that the unit 37 can be formed by other means such as disclosed in Figs. 11 and 12. In the modification shown in Fig. 11 the unit, indicated by numeral 58, is formed of an initially flat sheet of metal such as beryllium copper, stainless steel or other suitable material which is provided with substantially equally spaced corrugations 59. The corrugated sheath is formed into substantially tubular shape by fixedly joining the meeting ends as by soldering, welding, riveting or the like with the corrugations 59 extending longitudinally of the tube. Then the tubular unit 58 is made substantially conical in shape as by expanding the lower regions of the unit 58 and/or by closing in the top corrugations if necessary, the unit 58 being subsequently hardened to give life and resiliency to the material and to cause it to more permanently retain the conical shape while permitting ready distortion thereof.

By forcing the conically shaped corrugated unit 58 down over the pattern 28 and ringlike member 36 the unit 58 will be made to assume substantially the shapes of said pattern and member in the areas of engagement therewith.

The sheath 43 may be fitted intimately over the resultant cone shaped corrugated unit 58 similar to the construction shown in Fig. 2 and may be attached to the unit 58, if desired, by any suitable means such as by rivets 60, pins, clips or the like. Such a unit 58 can be easily made by conventional methods.

In use, the unit 58 will, due to its ability to expand circumferentially, easily conform to the shape of the pattern 28 and will simultaneously cause the overlying sheath 43 to assume said shape. However, due to the corrugations pressure exerted upon the unit 58 when forcing a rim 52 downwardly on the sheath 43 will not alter the shape thereof and because of being hardened it will be more resistant to wear in the vicinity of its contact with the patterns or formers.

The use of the device is substantially as follows:

After the lenses have been edged in the conventional edging machine to the desired contour shape as controlled by a particular selected pattern, the pattern is transferred from the edging machine to the device embodying the invention, that is, the pattern is placed upon the block 22, as shown best in Fig. 2. The sheath 43 having the spaced rods 38 internally thereof is forced downwardly to a position wherein the rods intimately engage the former or pattern 28 throughout the contour thereof and thereby cause the sheath in the vicinity of the former or pattern to accurately assume the shape of said pattern. Electrical energy is then directed to the heater and is controlled through the rheostat or the like 60 whereby the sheath may be heated to the proper required temperature. The mounting or frame of the size required by the patient or individual for whom it is being made is then placed with one of its rims fitting over the sheath, and through the heat conducted by the sheath in the heating unit the material of the rim is softened sufficiently to permit it to be forced downwardly of the sheath and thereby caused to expand and accurately assume the shape of the sheath as controlled by the shape of the pattern or former. The amount of stretching is just sufficient to permit the lenses to be snapped into the rims where, upon cooling, the rims will contract and firmly grip the contour edges of the lenses.

As stated above, if desired, the rims may be preheated by the use of a conventional salt bath or other suitable heating means.

After the lenses have been properly mounted in the lens rims, the bridge size, shape of temple and angle of nose pads, etc. may be varied as shown in Figs. 9 and 10 and as described above in accordance with the requirements of the particular individual.

The lens pattern or former 28, when the cone or sheath 43 is being removed from the heating unit for interchanging of patterns, sometimes has a tendency to remain internally of the sheath, in which instance, a suitable ejecting tool may be provided for displacing the pattern or former by extending the ejection tool through the top of the cone.

It is also apparent that the pattern 28 may be in position on the block 22 when the anvil 48 is being used or may be removed therefrom, if desired.

From the foregoing it will be understood that there is provided novel means and method for stretching and shaping the rims and bridges of eyeglass frames as well as for shaping nose pads and temples thereof in accordance with the objects of the invention. While the novel features of the invention have been described and are pointed out in the annexed claims, it will be understood that various omissions, substitutions and changes may be made in the means and methods described by those skilled in the art without departing from the spirit of the invention.

I claim:

1. In a device for stretching and shaping the rims of spectacle frames or the like made of heat softenable material, the combination of an upright, holding means carried by said upright, a pattern having a predetermined peripheral contour shape carried by said holding means, a substantially conical sheath supporting unit positioned over said upright and comprising a plurality of longitudinally disposed rods joined at one end and adapted to be adjustably spaced with respect to one another and having their opposed ends in substantially fixed spaced relation, said unit fitting over said pattern with the rods engaging the peripheral edge thereof and defining a surface in the general area of engagement therewith corresponding substantially to the contour shape of the pattern, a substantially conical rim carrying sheath fitted intimately over said supporting unit and assuming substantially the shape thereof as determined by said pattern, said sheath in the general area of engagement with said pattern assuming a surface shape corresponding substantially to the contour shape of the pattern, and heating means connected to said upright and serving to heat the material of the rim carried by said sheath, whereby said rim may be moved along the surface of the sheath in the general area of engagement with said pattern and will be stretched and shaped to the form determined by the pattern.

2. In a device for stretching and shaping the rims of spectacle frames or the like made of heat softenable material, the combination of an upright, holding means carried by said upright comprising a supporting member having one end secured to the end of said upright and in substantially axial alignment therewith and having securing means formed on the opposed end thereof, a pattern having a predetermined peripheral contour shape carried by said securing means on said holding means, a substantially conical sheath supporting unit positioned over said upright and comprising a plurality of longitudinally disposed rods joined at one end and adapted to be adjustably spaced with respect to one another and having their opposed ends in substantially fixed spaced relation, said unit fitting over said pattern with the rods engaging the peripheral edge thereof and defining a surface in the general area of engagement therewith corresponding substantially to the contour shape of the pattern, a substantially conical rim carrying sheath fitted intimately over said supporting unit and assuming substantially the shape thereof as determined by said pattern, said sheath in the general area of engagement with said pattern assuming a surface shape corresponding substantially to the contour shape of the pattern, and heating means connected to said upright and serving to heat the material of the rim carried by said sheath, whereby said rim may be moved along the surface of the sheath in the general area of engagement with said pattern and will be stretched and shaped to the form determined by the pattern.

3. A unit for use with a device of the character described comprising a plurality of adjacently related rods and a cone-shaped sheath of relatively thin, flexible, heat conducting material, said rods being supported internally of the sheath, said rods being connected with each other and each rod being positioned to lie in close relation with the inner wall of said sheath and together producing in themselves a cone-like shape, said sheath having a plurality of circumferentially spaced openings adjacent the lower portion thereof and said rods having portions extending within said openings and secured to the sheath to permit distortion thereof and of the sheath.

4. A unit for use with a device of the character described comprising a plurality of adjacently related rods and a cone-shaped sheath of relatively thin, flexible, heat conducting material, said rods being supported internally of the sheath and each positioned to lie in close relation with the inner wall of said sheath, said rods being joined with each other and producing in themselves together a cone-like shape, said sheath having a plurality of circumferentially spaced openings adjacent the lower portion thereof and said rods having portions extending within said openings and secured to the sheath to permit distortion thereof and of the sheath, said rods further having means adjacent their upper ends retaining said rods in joined relation with each other.

5. In a device of the character described, the combination of a base having an upright detachably supporting a pattern or former, a plurality of rods supported in adjacent relation with each other to form a cone shape and having their major portion free for movement with respect to each other, said rods fitting over the upright with their inner surfaces in relatively intimate engagement with the pattern or former so as to assume the shape of said pattern or former, and a sheath overlying said rods of relatively thin material shaped to the configuration of the rods.

6. In a device of the character described, the combination of a base having an upright detachably supporting a pattern or former, a plurality of rods supported in adjacent relation with each other to form a cone shape and having the major portions of said rods free for movement throughout said major portion thereof with respect to the adjacent rods, said rods together in said cone shape being adapted to fit over the upright with their inner surfaces in relatively intimate engagement with the pattern or former so as to assume the shape of said pattern or former, and a sheath overlying said rods of relatively thin material shaped to the configuration of the rods, said upright embodying a heating unit for heating the rods and sheath.

7. A unit for use with a device of the character described comprising a cone shaped sheath of relatively thin, flexible, heat conducting material and a flexible corrugated member supported internally thereof and embodying longitudinally extending corrugations positioned to lie in close relation with the inner wall of said sheath and producing together a conelike shape, said corrugations being sufficiently distortable to permit alteration of its diametric shape and size.

8. A unit for use with a device of the character described comprising a flexible corrugated member and a cone shaped sheath of relatively thin, flexible, heat conducting material and said corrugated member being supported internally thereof and embodying longitudinally extending corrugations positioned to lie in close relation with the inner wall of said sheath and producing together a cone-like shape, said corrugated member being in connected relation with the sheath and relatively free for distortion thereof to change its diameter size and shape as well as of the sheath.

9. In a device for stretching and shaping the rims of spectacle frames or the like made of heat softenable material, the combination of an upright, holding means carried by said upright, a pattern having a predetermined peripheral contour shape carried by said holding means, a substantially conical sheath supporting unit positioned over said upright and comprising a flexible corrugated member having longitudinally extending corrugations spaced with respect to one another to permit adjustment of the diametric size and shape of the unit, said unit fitting over said pattern and engaging the peripheral edge thereof and defining a surface in the general area of engagement therewith corresponding substantially to the contour shape of the pattern, a substantially conical rim carrying sheath fitted intimately over said supporting unit and assuming substantially the shape thereof as determined by said pattern, said sheath in the general area of engagement with said pattern assuming a surface shape corresponding substantially to the contour shape of the pattern, and heating means connected to said upright and serving to heat the material of the rim carried by said sheath, whereby said rim may be moved along the surface of the sheath in the general area of engagement with said pattern and will be stretched and shaped to the form determined by the pattern.

10. A device for stretching and shaping the rims of spectacle frames comprising a cone-shaped sheath of relatively thin flexible sheet material embodying a substantially continuous wall and having a plurality of adjacently related reinforcing portions supported internally thereof in the direction of the longitudinal axis of the cone-shaped sheath and positioned to lie in close relation with the inner surface of said sheath, said reinforcing portions being laterally adjustable relative to each other to permit radial deformation of the sheath as when a pattern of given shape is assembled therewith, said sheath when so radially deformed maintaining a continuously curved outer working surface for engagement with said rims, and the device being sufficiently rigid to prevent distortion of said working surface when so assembled with the pattern and the lens rim is positioned thereover to accomplish said stretching and shaping.

11. A device for stretching and shaping the rims of spectacle frames comprising a cone-shaped sheath formed of a sheet of relatively thin flexible material with its meeting edges joined together to form a substantially continuous wall and a plurality of separately formed adjacently related rods supported internally thereof in the direction of the longitudinal axis of the cone-shaped sheath and positioned to lie in close relation with the inner surface of said sheath, said rods being laterally adjustable relative to each other to permit radial deformation of the sheath as when a pattern of given shape is assembled therewith, said sheath when so radially deformed maintaining a substantially uninterrupted continuously curved outer working surface for engagement with said rims, and the device being sufficiently rigid to prevent distortion of said working surface when so assembled with the pattern and the lens rim is positioned thereover to accomplish said stretching and shaping.

12. A device for stretching and shaping the rims of spectacle frames comprising a cone shaped sheath formed of a sheet of relatively thin flexible material with its meeting edges joined together to form a substantially continuous wall and having a plurality of separately formed adjacently related rods supported internally thereof in close relation to the inner surface of the sheath, said rods extending in the direction of the longitudinal axis of the cone-shaped sheath and secured to said sheath, said rods being laterally adjustable relative to each other to permit radial deformation of the sheath as when a pattern of given shape is assembled therewith, said sheath when so radially deformed maintaining a continuously curved outer working surface for engagement with said rims, and the device being sufficiently rigid to prevent distortion of said working surface when so assembled with the pattern and the lens rim is positioned thereover to accomplish said stretching and shaping.

13. A device for stretching and shaping the rims of spectacle frames comprising the combination of an upright, holding means on said upright, a pattern of predetermined peripheral contour shape carried by said holding means and a cone shaped sheath of relatively thin flexible material mounted over said pattern and having a plurality of adjacently related reinforcing portions supported internally thereof in the direction of the longitudinal axis of the cone-shaped sheath and positioned to lie in close relation with the inner surface of said sheath, said reinforcing portions being laterally adjustable relative to each other to permit radial deformation of the sheath in accordance with the peripheral contour shape of said pattern located internally thereof and engaging said reinforcing portions, said sheath when so radially deformed maintaining a continuously curved outer working surface for engagement with said rims in the region of said pattern, and said working surface being held by the reinforcing portions against distortion when the rims are positioned thereover to accomplish said stretching and shaping.

14. A device for stretching and shaping the rims of spectacle frames formed of heat softenable material comprising the combination of an upright having self-contained heating means, holding means on said upright, a pattern of predetermined peripheral contour shape carried by said holding means and a cone shaped sheath of relatively thin flexible material mounted over said pattern and having a plurality of separately formed adjacently related rods supported internally thereof in the direction of the longitudinal axis of the cone-shaped sheath and positioned to lie in close relation with the inner surface of said sheath, said rods being laterally adjustable relative to each other to permit radial deformation of the sheath in accordance with the peripheral contour shape of said pattern located internally thereof and engaging said rods, said sheath when so radially deformed maintaining a continuously curved outer working surface for engagement with said rims in the region of said pattern, and said working surface being held by the rods against distortion when the rims are positioned thereover to accomplish said stretching and shaping, said upright holdng means, rods and sheath being formed of heat conducting material to cause said rims to be heated as they are positioned over the sheath to assist in said stretching and shaping thereof.

WILLIAM B. HEATH.

References Cited in the file of this patent

UNITED STATES PATENTS

| Number | Name | Date |
|---|---|---|
| 78,242 | Spaulding | May 26, 1868 |
| 209,425 | Ruhe | Oct. 29, 1878 |
| 365,575 | Campbell | June 28, 1887 |
| 446,396 | Starr | Feb. 10, 1891 |
| 491,853 | Noe | Feb. 14, 1893 |
| 882,012 | Morris | Mar. 17, 1908 |
| 963,544 | Graef | July 5, 1910 |
| 1,080,238 | Stake | Dec. 2, 1913 |
| 1,415,659 | Lawlor | May 9, 1922 |
| 1,441,316 | Walkowe | Jan. 9, 1923 |
| 1,541,375 | Neuwirth et al. | June 9, 1925 |
| 1,572,776 | De Nome | Feb. 9, 1926 |
| 1,593,865 | Caron | July 27, 1926 |
| 1,636,473 | Kelley | July 19, 1927 |
| 1,674,575 | Stead | June 19, 1928 |
| 1,734,411 | Welsh | Nov. 5, 1929 |
| 2,502,088 | Gorski | Mar. 28, 1950 |
| 2,552,043 | Horvath | May 8, 1951 |
| 2,623,423 | Horvath | Dec. 30, 1952 |
| 2,628,517 | Klofanda | Feb. 17, 1953 |